(12) United States Patent
Eguchi

(10) Patent No.: US 6,934,960 B2
(45) Date of Patent: Aug. 23, 2005

(54) OPTICAL DISK APPARATUS

(75) Inventor: Naoki Eguchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 222 days.

(21) Appl. No.: 10/446,805

(22) Filed: May 29, 2003

(65) Prior Publication Data

US 2003/0223346 A1 Dec. 4, 2003

(30) Foreign Application Priority Data

May 31, 2002 (JP) ........................................ 2002-158902

(51) Int. Cl.$^7$ .............................................. G11B 7/08
(52) U.S. Cl. ...................................................... 720/691
(58) Field of Search ........................................ 720/691

(56) References Cited

U.S. PATENT DOCUMENTS

| 6,324,152 B1 | 11/2001 | Eguchi et al. | ............... 720/697 |
| 2004/0008602 A1 * | 1/2004 | Suzuki | ....................... 369/77.1 |

FOREIGN PATENT DOCUMENTS

| JP | 2-105274 | 4/1990 |
| JP | 5-36608 | 5/1993 |
| JP | 2001-60323 | 3/2001 |
| JP | 2001-283446 | 10/2001 |
| JP | 2001-307338 | 11/2001 |

OTHER PUBLICATIONS

DVD–ROM, SD–M1002, Toshiba Review, vol. 51, No. 12, 1996.
DVD–ROM, SD–C2002, Toshiba Review, vol. 53, No. 2, 1998.

* cited by examiner

*Primary Examiner*—David D. Davis
(74) *Attorney, Agent, or Firm*—Pillsbury Winthrop Shaw Pittman, LLP

(57) ABSTRACT

An optical disk apparatus includes a main chassis and a sub-chassis provided on a drawer, and has a skew adjusting mechanism of the main chassis and the sub-chassis which is skew-adjusted with reference to a rotational axis in tangential direction $X_T$, which is parallel to a spot trajectory L of an optical pickup and located in the vicinity of the spot trajectory L, and a rotational axis in radial direction $X_R$ perpendicular to the rotational axis in tangential direction $X_T$. This enables the skew adjustment in which a change in height of the optical pickup is small during the adjustment and distortion is small.

10 Claims, 6 Drawing Sheets

US 6,934,960 B2

OPTICAL DISK APPARATUS

CROSS-REFERENCE TO RELATED APPLICATIONS

This application is based upon, and claim the benefit of priority from the prior Japanese Patent Application No. 2002-158902, filed May 31, 2002, the entire contents of which are incorporated herein by reference.

BACKGROUND OF THE INVENTION

1. Field of the Invention

The present invention relates to an optical disk apparatus, particularly relates to an optical disk apparatus having a skew adjusting mechanism of a main chassis and a sub-chassis, which store an optical pickup mechanism and a disk motor.

2. Description of the Related Art

Recently miniaturization and high performance are required for the optical disk apparatus as a whole while the apparatus is becoming widespread. Therefore, mechanically high accuracy is also required in a structure of the optical disk apparatus. For example, compatibility between the miniaturization and the high accuracy are desired in the skew adjusting mechanism of the main chassis and the sub-chassis, which store the optical pickup mechanism and the disk motor.

In Jpn. Pat. Appln. KOKAI Publication No. 2001-60323, there is disclosed a skew adjusting mechanism between a main chassis and a sub-chassis in which the skew adjustment is performed with reference to a rotational axis in a tangential direction and a rotational axis in a radial direction. However, the skew adjustment is performed in the structure in which the rotational axis in the tangential direction is parallel to a spot trajectory of the optical pickup which is the reference of an error, while the spot trajectory of the optical pickup and the rotational axis in the tangential direction are located far away from the spot trajectory of the optical pickup which is the reference of the error. Accordingly, there is a problem that structural balance is bad, a change in height of the optical pickup is increased during the adjustment, and the error is easily generated.

That is, in the skew adjusting mechanism between the main chassis and the sub-chassis in the conventional apparatus, the spot trajectory of the optical pickup and the rotational axis in the tangential direction are located far away from the spot trajectory of the optical pickup which is the reference of the error. Therefore, there is the problem that the structural balance is bad, a stroke of a head actuator is increased during the adjustment, the balance between the right and left sides is bad relative to the spot trajectory, and the error is easily generated.

BRIEF SUMMARY OF THE INVENTION

According to an embodiment of the present invention, an optical disk apparatus which beam-irradiates an optical disk rotated by a disk motor with an optical pickup to record or reproduce data, comprises a drawer which is drawn from a cabinet B and a main chassis and a sub-chassis provided on the drawer and combined while the main chassis and the sub-chassis sandwich a feeding mechanism of the optical pickup and a disk motor, wherein the main chassis and the sub-chassis have a skew adjusting mechanism which is skew-adjusted with reference to a rotational axis in tangential direction $X_T$, which is parallel to a spot trajectory L of the optical pickup and located in the vicinity of the spot trajectory L, and a rotational axis in radial direction $X_R$ perpendicular to the rotational axis in tangential direction.

DETAILED DESCRIPTION OF THE INVENTION

Figure 1:
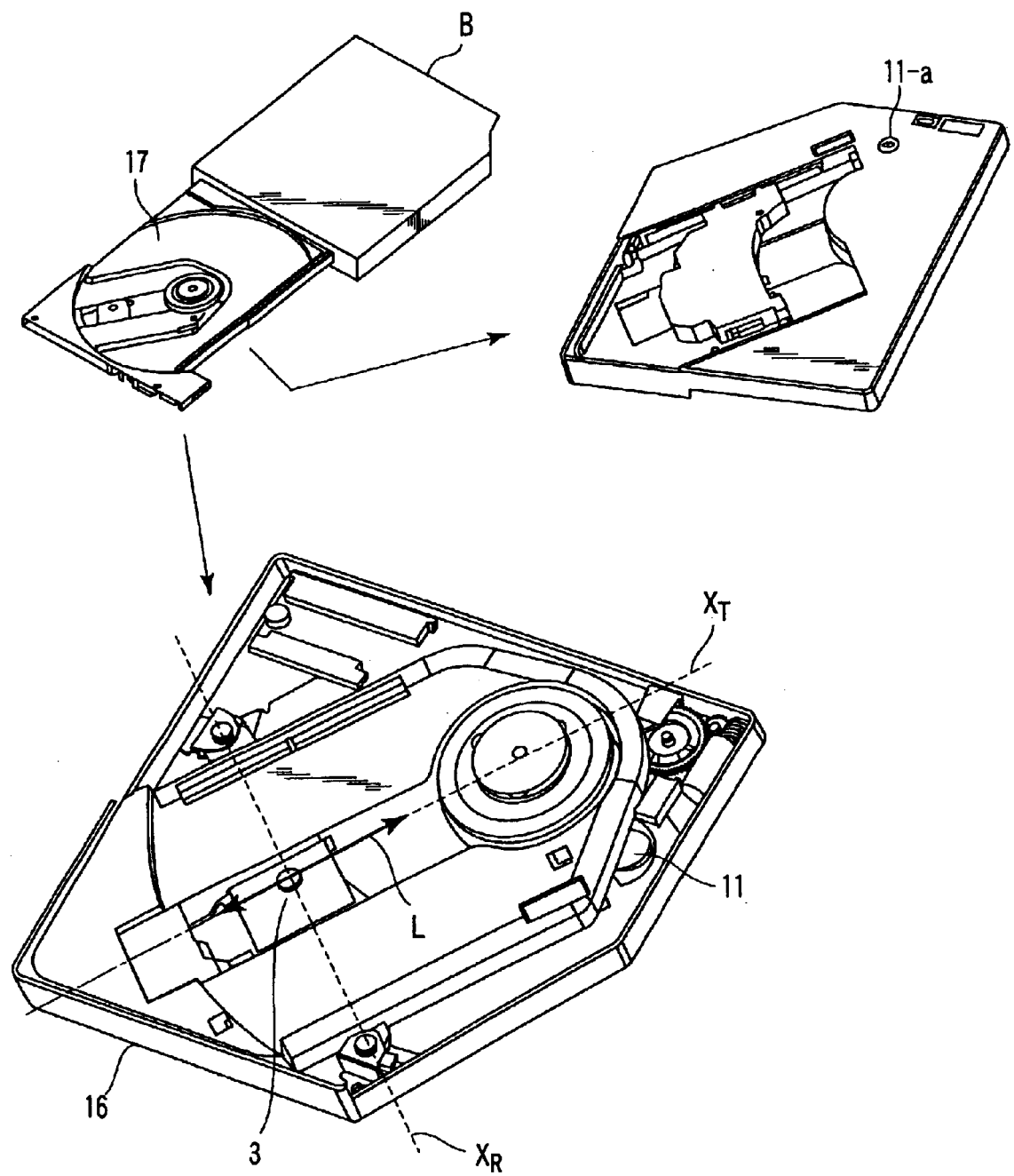
FIG. 1 is a perspective view showing a cabinet, a drawer, and a main chassis of an optical disk apparatus according to one embodiment of the invention.

An optical disk apparatus according to one embodiment of the invention will be described in detail below referring to the drawings. FIG. 1 is a perspective view showing a cabinet, a drawer, and a main chassis of the optical disk apparatus according to one embodiment of the invention, and FIG. 2 is an exploded view showing the main chassis, a sub-chassis, and components of the optical disk according to one embodiment of the invention.

(Skew Adjusting Mechanism)

Figure 2:
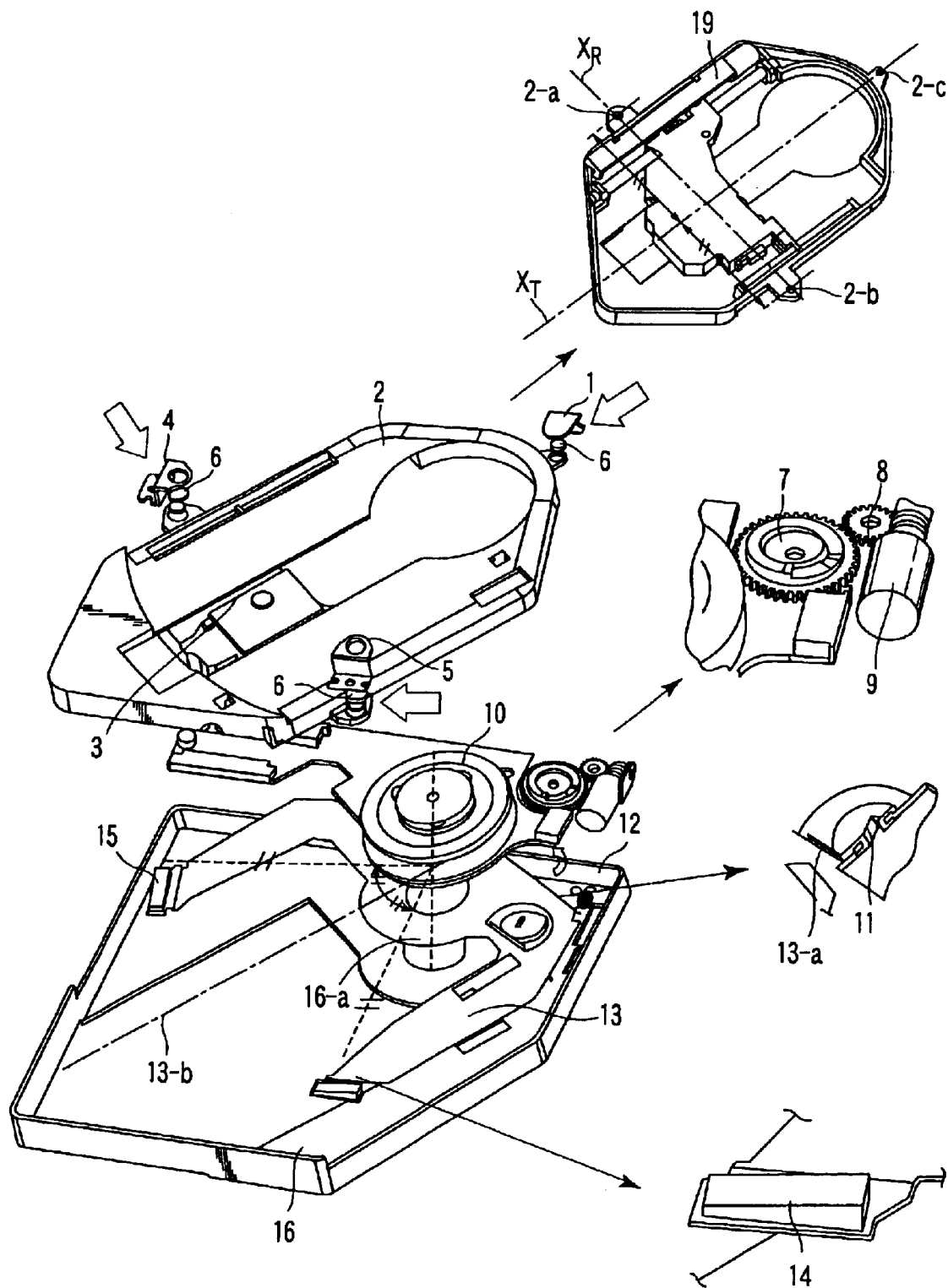
FIG. 2 is an exploded view showing the main chassis, a sub-chassis, and components of the optical disk according to one embodiment of the invention.

In FIGS. 1 and 2, the optical disk drive according to one embodiment of the invention has, in order from the cabinet B, the drawer 17 in which the optical disk is stored and the main chassis 16 and the sub-chassis 2 which are included in the drawer 17. Further, FIG. 1 shows a key groove portion 11a of an adjusting cam in tangential direction, which is described in FIGS. 2 and 3.

FIG. 2 also shows an exploded view of the main chassis, the sub-chassis, and components. An adjusting arm in tangential direction 13 is provided in the main chassis 16 and rotating-supported on the main chassis 16 in a motor central axis 16a. A position (angle) of the adjusting arm in tangential direction 13 can be controlled in such a manner that a rotational bias spring 12 causes a bias wall 13a to abut on the skew adjusting cam in tangential direction 11. In both side end portions of a main axis and a sub-axis on the adjusting arm in tangential direction 13, an adjusting cam block (R) 14 and an adjusting cam block (L) 15, which are similar, are formed opposite to each other at positions which are symmetric with respect to an arm central axis 13b of the optical pickup and the spot trajectory L of the optical pickup. The disk motor 10 is also fixed to the main chassis 16 in the motor central axis 16a, and a skew adjusting cam gear in radial direction 7 is rotating-supported on the opposite side of the optical pickup 3 near the disk motor 10 on the main chassis 16. A driving gear 8 which engages the skew adjusting cam gear in radial direction 7 and a tilt driving motor 9 which drives the driving gear 8 are mounted on the main chassis 16.

On the other hand, the optical pickup 3 and a driving mechanism 19 are incorporated into the sub-chassis 2, and pressed on each surface of cams 7, 14, and 15 with a compression spring 6 in spherical protrusions 2-*a*, 2-*b*, and 2-*c* which are formed on a backside. Similarly to the cam blocks 14 and 15, the spherical protrusions 2-*a* and 2-*b* are arranged in symmetric with respect to the rotational axis in tangential direction $X_T$, and the spherical protrusion 2-*c* is arranged at the position which is on the line of the rotational axis in tangential direction $X_T$ and an extended line of the trajectory L of the optical pickup, which is shown in FIG. 1. A positioning plate (L) 4 and a positioning plate (R) 5 position the sub-chassis 2 on the main chassis 16. The positioning plate (L) 4 and the positioning plate (R) 5 pressing the compression spring 6, and a pressure spring plate 1 press the compression spring 6.

As described above, the sub-chassis 2 is biased at three positions (three broad arrows in FIG. 2), i.e., the position of the pressure spring plate 1 located on the rotational axis in tangential direction $X_T$ superposed on the trajectory L of the optical pickup, the position of the positioning plate (L) 4 on the rotational axis in radial direction $X_R$ perpendicular to the rotational axis in tangential direction $X_T$, and the position of the positioning plate (R) 5. Further, by using the adjusting arm in tangential direction 13, the skew adjustment can be performed with the skew adjusting cam in the tangential direction 11 with reference to the rotational axis in tangential direction $X_T$.

(Skew Adjusting Operation)

Figure 3:
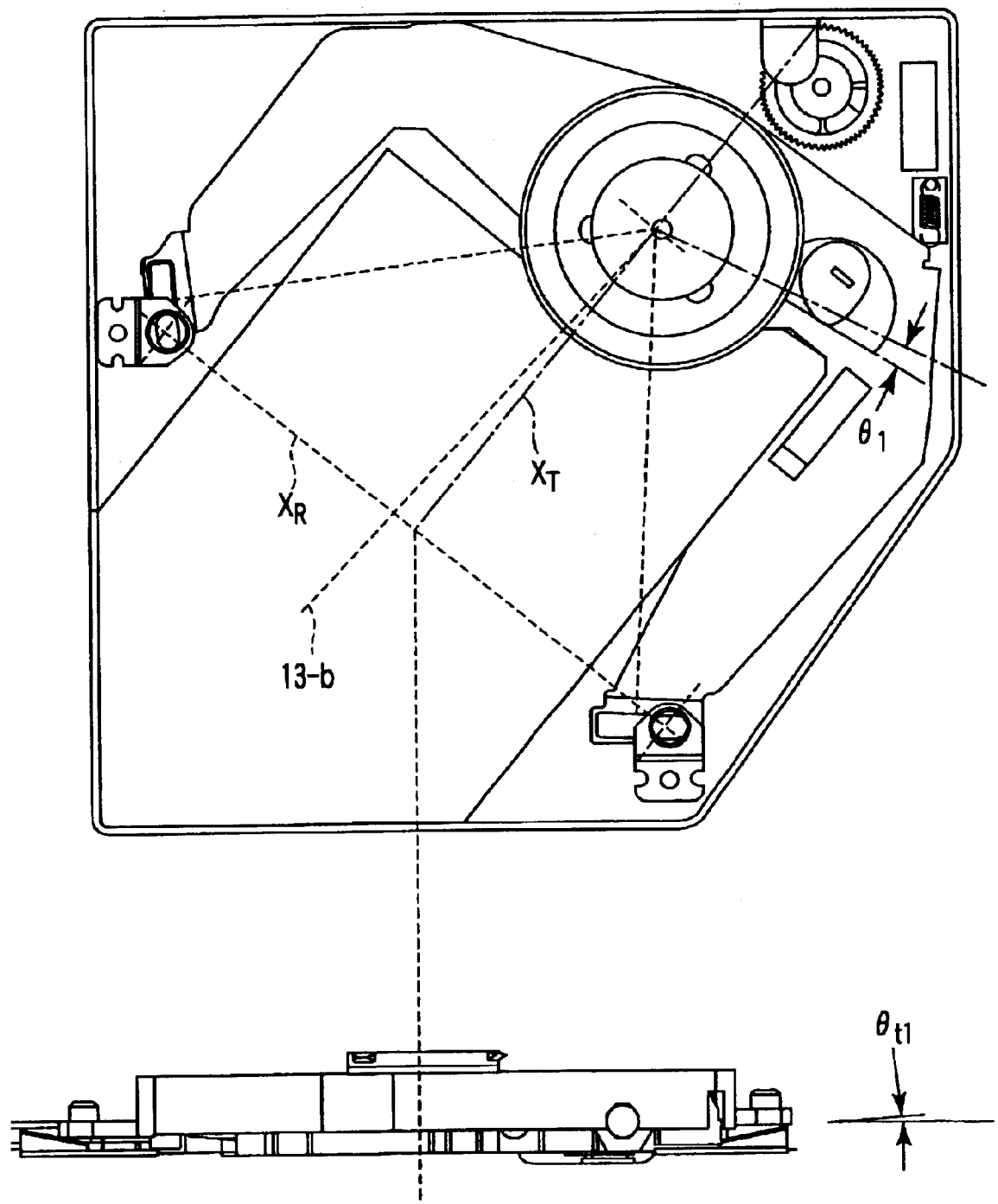
FIG. 3 shows a state in which the main chassis and the sub-chassis of the optical disk apparatus the optical disk apparatus according to one embodiment of the invention are elevated upward toward the right in operation in a tangential direction.

Actual skew adjusting operation (in tangential direction and radial direction) of the skew adjusting mechanism which is constructed in the above-described way will be described referring to FIGS. 3 to 6. FIG. 3 shows a state in which the main chassis and the sub-chassis are elevated upward toward the right in the operation in the tangential direction, FIG. 4 shows a neutral state of the main chassis and the sub-chassis of the optical disk apparatus in the operation in the tangential direction, FIG. 5 shows a state in which the main chassis and the sub-chassis are elevated upward toward the left in the operation in the tangential direction, and FIGS. 6A to 6C are views illustrating the operation in the radial direction of the main chassis and the sub-chassis.

FIG. 3 shows the state in which the adjusting arm 13 is rotated rightward by $\theta_1$ degree by rotating the adjusting cam 11. While the height near the center of the optical pickup is held constant, a skew angle (tangential direction) is changed by $\theta_{t1}$ degree in such a manner that the L side is descended by an extent as the R side is elevated by the same extent from the neutral position by the action of the opposing adjusting cam block (L) 15 and adjusting cam block (R) 14.

Figure 4:
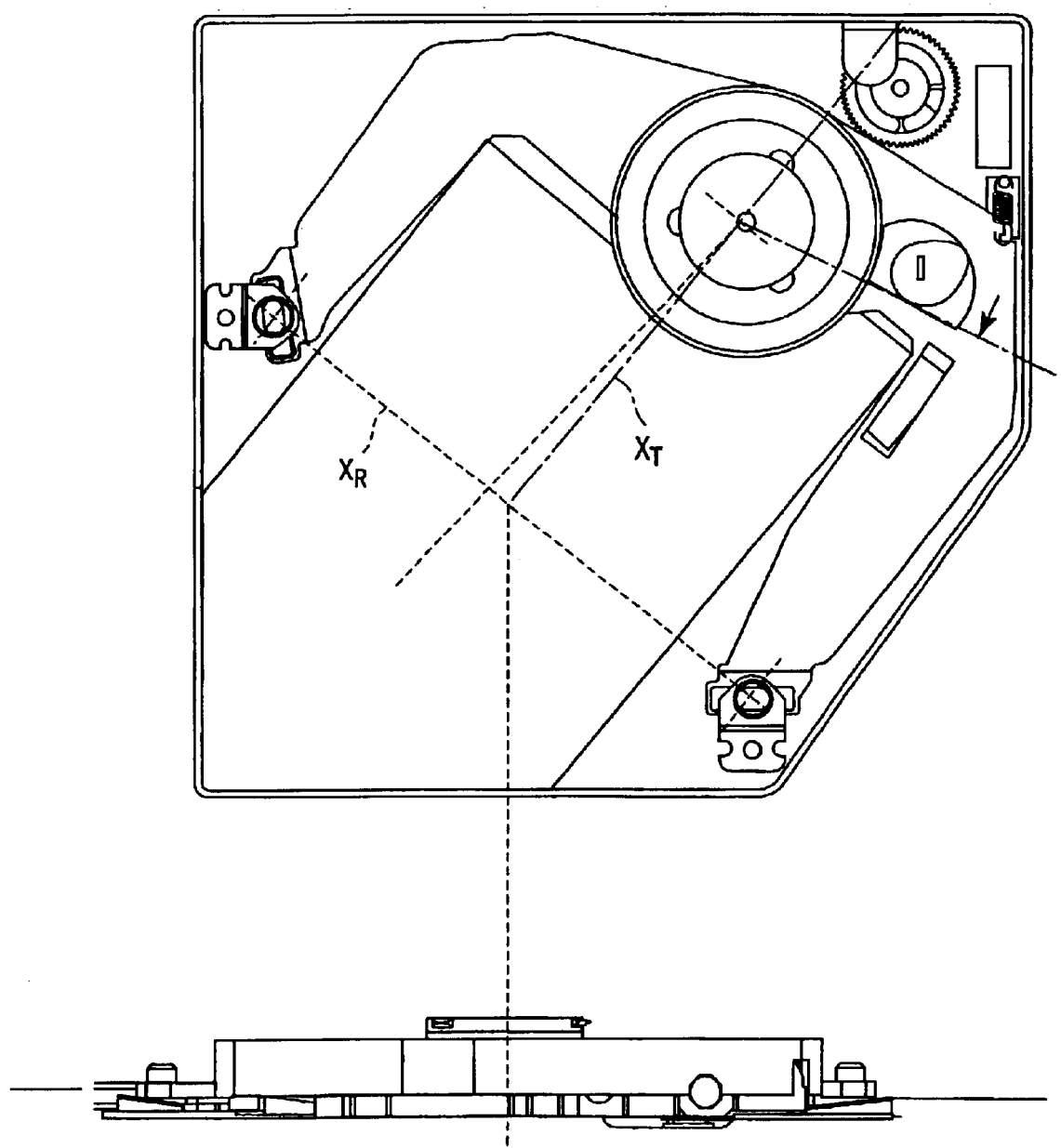
FIG. 4 shows a neutral state of the main chassis and the sub-chassis of the optical disk apparatus according to one embodiment of the invention in the operation in the tangential direction.

FIG. 4 shows the neutral state of positional relationship, the two spherical protrusions 2-*a* and 2-*b* bias each central portion of the adjusting cam block (L) 15 and adjusting cam block (R) 14, the main chassis 16 is basically parallel to the sub-chassis 2.

Figure 5:
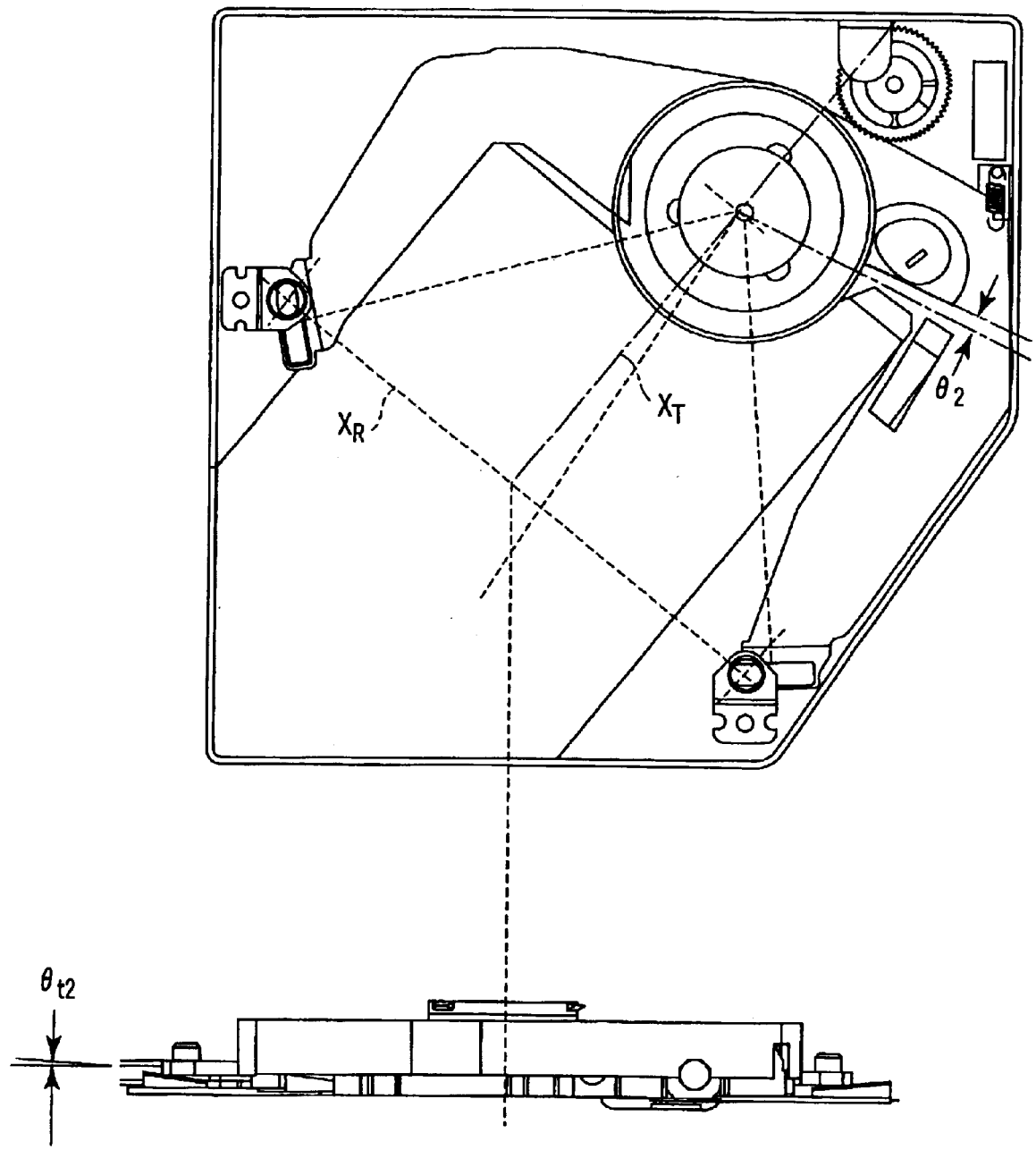
FIG. 5 shows a state in which the main chassis and the sub-chassis of the optical disk apparatus the optical disk apparatus according to one embodiment of the invention are elevated upward toward the left in the operation in the tangential direction.
Figure 6A:
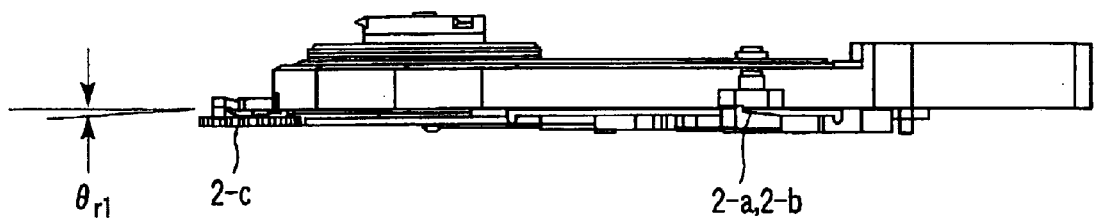
FIGS. 6A to 6C are views illustrating the operation in a radial direction of the main chassis and the sub-chassis of the optical disk apparatus according to one embodiment of the invention.
Figure 6B:
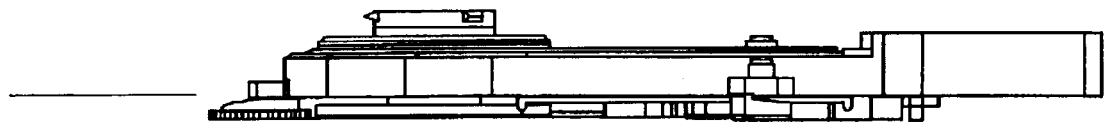
Figure 6C:
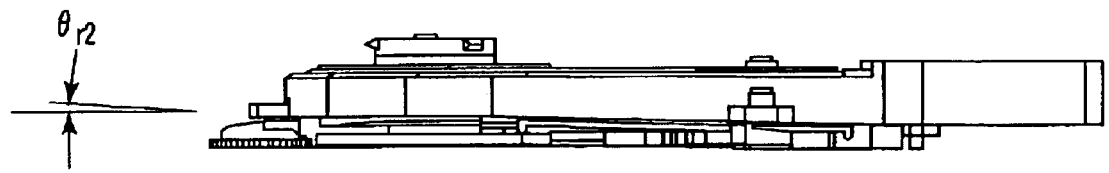

On the contrary to FIG. 3, FIG. 5 shows the state in which the adjusting arm 13 is rotated leftward by $\theta_2$ degree. While the height near the center of the optical pickup is held constant, the skew angle of the tangential direction is changed by $\theta_{t2}$ degree in such a manner that the R side is descended by an extent as the L side is elevated by the same extent.

Accordingly, since the spot trajectory L of the optical pickup and the rotational axis in tangential direction $X_T$ are nearly superposed by rotating the adjusting cam 11, the skew in the tangential direction can be adjusted without changing the height of the center (in the vicinity of the spot trajectory) of the optical pickup. Consequently, unlike the conventional apparatus, there is no error which is caused by the change in the height of the optical pickup during the adjustment while the rotational axis in tangential direction $X_T$ is located far away from the spot trajectory L of the optical pickup.

(Skew Adjustment in Radial Direction)

A skew adjusting method in the radial direction will be described below referring to FIGS. 6A to 6C. FIG. 6A shows the state in which the spherical protrusion (C) 2-*c* is guided to the lowermost point of the cam gear 7 and skewed by $\theta_{r1}$ degree in the radial direction with the motor side down. FIG. 6B shows the neutral position, and FIG. 6C shows the state in which the spherical protrusion (C) 2*c* follows the uppermost point of the cam gear to be skewed by $\theta_{r2}$ degree in the radial direction with the motor side up. The rotational axis is arranged at an almost intermediate point of the stroke of the inner radius and the outer radius of the optical pickup in the rotational axis in radial direction $X_R$ which connects the spherical protrusion (R) 2-*a* and the spherical protrusion (L) 2-*b*. Therefore, the amount of the change in the height near the center of the optical pickup, which is caused by the skew adjustment in the radial direction, is divided between the inner radius and the outer radius, which enables the change in the height to be suppressed in a minimum amount.

In the embodiment, the cam gear 7 can be electrically adjusted with the driving gear 8 and the tilt driving motor 9, the skew adjustment in the radial direction during the operation of recording and reproducing, i.e., so-called a tilt servo can be easily performed. This is a tilt servo mechanism which can be also applied to a slim type of optical disk recording and reproducing drive for notebook computers.

(Tilt Control Performed with Tilt Driving Motor)

In the embodiment of the invention, the skew adjusting mechanism which can be adjusted in the radial direction is formed in such a manner that the driving gear 8 and the driving motor 9 are eliminated and the skew adjusting cam gear in radial direction 7 is only left in the construction of FIG. 2. On the other hand, the skew adjusting function in the tangential direction is formed in such a manner that the key groove 11-*a* or the like is formed to be constructed rotatably on the backside of the skew adjusting cam in the tangential direction 11. Both can independently perform the adjustments in the tangential and radial directions. This can be applied to the drive in which the active tilt control is not required in the recording and reproducing operation.

Though a person skilled in the art can realize the invention by the various embodiments described above, various modifications of the embodiments can be easily conceived by a person skilled in the art, and the invention can be applied to various modes without any inventive ability. Accordingly, the invention covers a wide range which is not contradictory to the disclosed principle and novel feature, and it is not limited to the above-described embodiments.

For example, above description explained the present invention by using the expression of "the skew adjusting function", however, it is possible that the present invention can be explained by using the expression of "the position adjusting function" of the main chassis and the sub-chassis. Above two expressions are different each other, but those expressions show same technical matter.

As described in detail above, the invention can provide the optical disk apparatus having the skew adjusting mechanism in which the change in the height of the optical pickup is small during the adjustment in a manner that constructs the skew adjusting mechanism in which the bias position of the sub-chassis is arranged such that the rotational axis in tangential direction $X_T$ of the skew adjusting mechanism is located close to the spot trajectory L of the optical pickup.

What is claimed is:

1. An optical disk apparatus which beam-irradiates an optical disk rotated by a disk motor with an optical pickup to record or reproduce data, comprising:

a drawer which is drawn from a cabinet;

a main chassis provided on the drawer and having the disk motor; and a sub-chassis mounted on the main chassis and having a feeding mechanism of the optical pickup, wherein the main chassis and the sub-chassis have a skew adjusting mechanism which is skew-adjusted with reference to a rotational axis in tangential direction, which is parallel to a spot trajectory of the optical pickup and located in the vicinity of the spot trajectory, and a rotational axis in radial direction perpendicular to the rotational axis in tangential direction.

2. The optical disk apparatus according to claim 1, wherein said skew adjusting mechanism is biased to be skew-adjusted at a first position and a second position, which are located in symmetric with respect to the spot trajectory of the optical pickup and on the rotational axis in radial direction, and a third position which is located on an extended line of the spot trajectory of the optical pickup and the rotational axis in tangential direction.

3. The optical disk apparatus according to claim 1, wherein an arm and a cam which is in contact with the arm are provided between the main chassis and the sub-chassis, and the skew adjustment is performed with reference to the rotational axis in tangential direction by rotating the cam.

4. The optical disk apparatus according to claim 1, wherein the skew adjustment is performed with reference to the rotational axis in radial direction by a skew adjusting cam gear in radial direction which is in contact with the sub-chassis and a tilt servo motor which is coaxially mounted with the skew adjusting cam gear in radial direction.

5. The optical disk apparatus according to claim 1, wherein the skew adjustment is performed with reference to the rotational axis in radial direction by rotating the skew adjusting cam gear in radial direction which is in contact with the sub-chassis, and the skew adjustment is performed with reference to the rotational axis in tangential direction by rotating the cam, which is in contact with the arm provided between the main chassis and the sub-chassis and has a groove.

6. An optical disk apparatus which beam-irradiates an optical disk rotated by a disk motor with an optical pickup to record or reproduce data, comprising:

a drawer which is drawn from a cabinet;

a main chassis provided on the drawer and having the disk motor; and a sub-chassis mounted on the main chassis and having a feeding mechanism of the optical pickup, wherein the main chassis and the sub-chassis have a position adjusting mechanism which is position-adjusted with reference to a rotational axis in tangential direction, which is parallel to a spot trajectory of the optical pickup and located in the vicinity of the spot trajectory, and a rotational axis in radial direction perpendicular to the rotational axis in tangential direction.

7. The optical disk apparatus according to claim 6, wherein said position adjusting mechanism is biased to be position-adjusted at a first position and a second position, which are located in symmetric with respect to the spot trajectory of the optical pickup and on the rotational axis in radial direction, and a third position which is located on an extended line of the spot trajectory of the optical pickup and the rotational axis in tangential direction.

8. The optical disk apparatus according to claim 6, wherein an arm and a cam which is in contact with the arm are provided between the main chassis and the sub-chassis, and the position adjustment is performed with reference to the rotational axis in tangential direction by rotating the cam.

9. The optical disk apparatus according to claim 6, wherein the position adjustment is performed with reference to the rotational axis in radial direction by a position adjusting cam gear in radial direction which is in contact with the sub-chassis and a tilt servo motor which is coaxially mounted with the position adjusting cam gear in radial direction.

10. The optical disk apparatus according to claim 6, wherein the position adjustment is performed with reference to the rotational axis in radial direction by rotating the position adjusting cam gear in radial direction which is in contact with the sub-chassis, and the position adjustment is performed with reference to the rotational axis in tangential direction by rotating the cam, which is in contact with the arm provided between the main chassis and the sub-chassis and has a groove.

* * * * *